United States Patent [19] [11] 3,891,428
Yordanov et al. [45] June 24, 1975

[54] METHOD FOR TREATING NON-FERROUS METAL SLAG

[75] Inventors: Yordan Todorov Yordanov; Georgi Ivanov Abrashev; Georgi Tenev Georgiev; Velyo Dimitroy Zhekov; Yancho Hristov Yanev; Ivan Georgiev Rossenov; Velcho Angelov Prodanov; Yordan Todev Roussey, all of Plovdiv, Bulgaria

[73] Assignee: Kombinat Za Zvetni Metali "Dimiter Blagoev", Plovdiv, Bulgaria

[22] Filed: Oct. 30, 1972

[21] Appl. No.: 302,565

Related U.S. Application Data

[60] Continuation-in-part of Ser. No. 67,286, Aug. 26, 1970, abandoned, which is a division of Ser. No. 625,850, March 24, 1967, Pat. No. 3,608,881.

[52] U.S. Cl. ............................ 75/24; 75/30; 75/42
[51] Int. Cl. ............................................ C21b 3/04
[58] Field of Search ...................... 75/24, 30, 52, 42

[56] References Cited
UNITED STATES PATENTS

| | | | |
|---|---|---|---|
| 1,393,749 | 10/1921 | Carstens | 75/42 |
| 1,482,553 | 2/1924 | Grabill | 75/42 |
| 1,782,418 | 11/1930 | Garred | 75/24 |
| 1,932,656 | 10/1933 | Fleming et al. | 75/24 |
| 2,035,550 | 3/1936 | Karwat | 75/30 |
| 3,112,194 | 11/1963 | Devries | 75/52 X |

Primary Examiner—Winston A. Douglas
Assistant Examiner—John F. Niebling
Attorney, Agent, or Firm—Waters, Schwartz & Nissen

[57] ABSTRACT

A method of treating non-ferrous slag in a furnace by injecting liquid fuel and air into molten slag to heat and reduce the slag. The injection of the liquid fuel and air is obtained by discharging the liquid fuel under a pressure of at least 12 atmospheres through a nozzle to produce an atomized stream of the fuel, introducing the atomized stream of fuel into a stream of air, and carrying the mixed streams into the slag.

8 Claims, 2 Drawing Figures

1

METHOD FOR TREATING NON-FERROUS METAL SLAG

CROSS-RELATED APPLICATIONS

This application is a continuation-in-part of application Ser. No. 67,286 filed Aug. 26, 1970 now abandoned which in turn was a division of Ser. No. 625,850 filed Mar. 24, 1967 which issued as U.S. Pat. No. 3,608,881 Sept. 25, 1970.

BACKGROUND

1. Field of the Invention

This invention relates to a method for treating non-ferrous slag in slag fuming furnaces and similar blowing furnaces or converters.

2. Prior Art

It is known to subject slags obtained in the production of non-ferrous metals (which slags contain one or more of lead, zinc, tin and other elements that are volatile at moderate temperatures) to a slag-fuming process in which the molten slag is blown with a mixture of powdered coal and air, the mixture forming a fuel and reducing atmosphere. However, the use of solid fuels, such as powdered coal, has a number of disadvantages which include:

a. its abrasiveness which results in a frequent need to replace channels, tuyeres, etc. with consequent stoppages in the fuming process;

b. inaccuracy and difficulty of proportioning during the various stages of the fuming process; and c. the risk of explosion.

The process of discharging an atomized liquid fuel reducing agent under pressure into a non-ferrous slag is well known in the art. Generally, atomized fuel injection by pressure atomization of the liquid fuel is one preferred method of operation in a conventional blast furnace. Pressure atomization can be defined to include atomization by mechanical means, an air stream, and the like. The atomized reducing agent, preferably preheated to as high a temperature as practicable, is blown through tuyeres provided at the bottom of the furnace. Provision is made for the introduction into the furnace, above the level of the molten charge therein, of air or other oxidizing gas, in sufficient amount to combine with the reducing gas that passes unconsumed through the molten charge. The reducing furnace is also preferably provided with fuel burners as a supplementary source of heat. The described process has been used as an intermediate step of the pyrometallurgical process of dividing a mixed sulphide ore containing iron and copper (U.S. Pat. No. 1,976,735).

As stated, pressure atomization can be defined to include atomization by air. Such a method of pressure atomization uses the high velocity of an air blast to atomize the liquid fuel as it emerges from the end of the fuel injection means. It should be noted however, that the methods of discharging atomized liquid fuel reducing agents without placing the fuel itself under pressure or using the air blast to atomize the liquid fuel, are not suitable for the operation of a fuming process, as the fuming furnace is charged with molten slag.

In achieving successful operation of a fuming furnace for the elimination of lead and zinc from a molten metallurgical slag, it was found that the ratio of air to a liquid fuel reducing agent must be appreciably higher than is customary when using a solid carbonaceous reducing agent such as powdered coal. A known method of operating slag fuming and like furnaces comprises injecting fuel oil at an angle into air streams flowing through the tuyeres of the furnace, and proportioning the air and oil so that the air corresponds to substantially less than the quantity of air theoretically required to burn the oil completely to carbon dioxide and water vapor but not less than one-half of said theoretical quantity. (Australian Pat. No. 206,796). It is noteworthy that in accordance with this prior art teaching no particular effort is made to atomize or otherwise uniformly disperse the fuel oil in the air stream flowing through the tuyeres. On the contrary, those skilled in the art are of the opinion that it is advantageous to have a substantially continuous fine stream of oil conveyed with a large stream of air directly into the molten contents of the furnace.

Many other attempts have been made in the past to use a liquid fuel for the purpose of heating and of producing a reducing atmosphere in the slag-fuming process, but heretofore, such attempts have not resulted in a practical process. In fact, many problems are associated with the injection of liquid fuels in fuming furnaces. First of all, the efficient operation of such a furnace involves the close maintainance of certain furnace variables. It is important that the injection of the liquid fuel be closely controlled so that the injection of excess fuel will not upset the furnace operation. There are critical problems associated with proper fuel flow, air blast flow, temperatures, the detection of operational difficulties and the like. Thus, blast air and fuel flow must be maintained in certain critical operating proportions to ensure proper operating conditions. In addition, the clogging of individual tuyeres must be properly conducted in order to obtain maximum furnace efficiency. Thus, any whirling and loss of temperature of the materials flowing through the tuyeres should be avoided and the point of intersection of both material flows must be exactly disposed since it is critical for the proper burning process. Another problem is the prevention of fuel oil carbonization in the fuel injecting means due to heat. Many other problems are encountered so that all attempts in this sense were fruitless up to the present.

SUMMARY OF THE INVENTION

It is an object of the present invention to provide for the successful operation of slag fuming and similar furnaces with tuyeres that are charged with a mixture of liquid fuel and air.

It is a further object of the invention to provide a method for treating non-ferrous metal slag, which uses liquid fuels such as masout or naphtha, both as a fuel and as a source of reducing atmosphere required in a slag-fuming process for the treatment of slag obtained in non-ferrous metallurgical processes.

After much experimentation the inventors have discovered that mechanical atomization of the liquid fuel by means of a pressure atomization nozzle will result in advantages which, according to the prior art, could not be obtained. These advantages include a cleaner, more efficient burning process, better fuel regulation, and the possibility of choosing from a wide range of liquid fuels, the range including both high-sulphur and low-sulphur fuel oils.

Accordingly, the present invention provides, in a method for treating non-ferrous metal slags, the step which comprises atomizing a liquid fuel by mechanical means at a pressure between 12 to 40 atmospheres, preferably between 15 to 25 atmospheres, mixing the atomized liquid fuel with air, and injecting the resulting mixture into the slag to be treated.

It was found furthermore that a proper burning process providing the maximum efficiency of the furnace could be obtained by mixing the atomized liquid fuel with the air in such a manner that the point of intersection of both material flows into the injecting means is brought as close as possible to the outlet of the atomizing nozzle. A tuyere has been developed in which the air is supplied to an annular passage upstream of the nozzle and in immediate proximity therewith. In such a manner and with the aid of a stem supporting the nozzle and itself being supported in cantilever fashion in the main body of the tuyere, the above condition is fulfilled and any whirling and loss of the temperature of the mixture are avoided.

DETAILED DESCRIPTION

Figure 1:
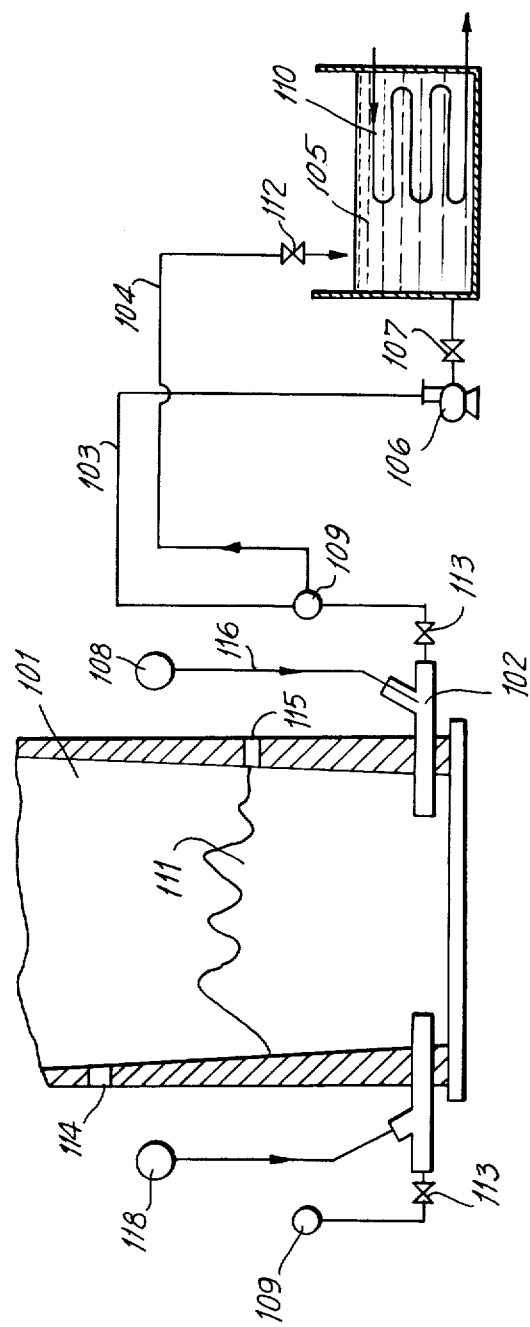
FIG. 1 is a diagrammatic illustration of apparatus for carrying out the method of the present invention.
Figure 2:
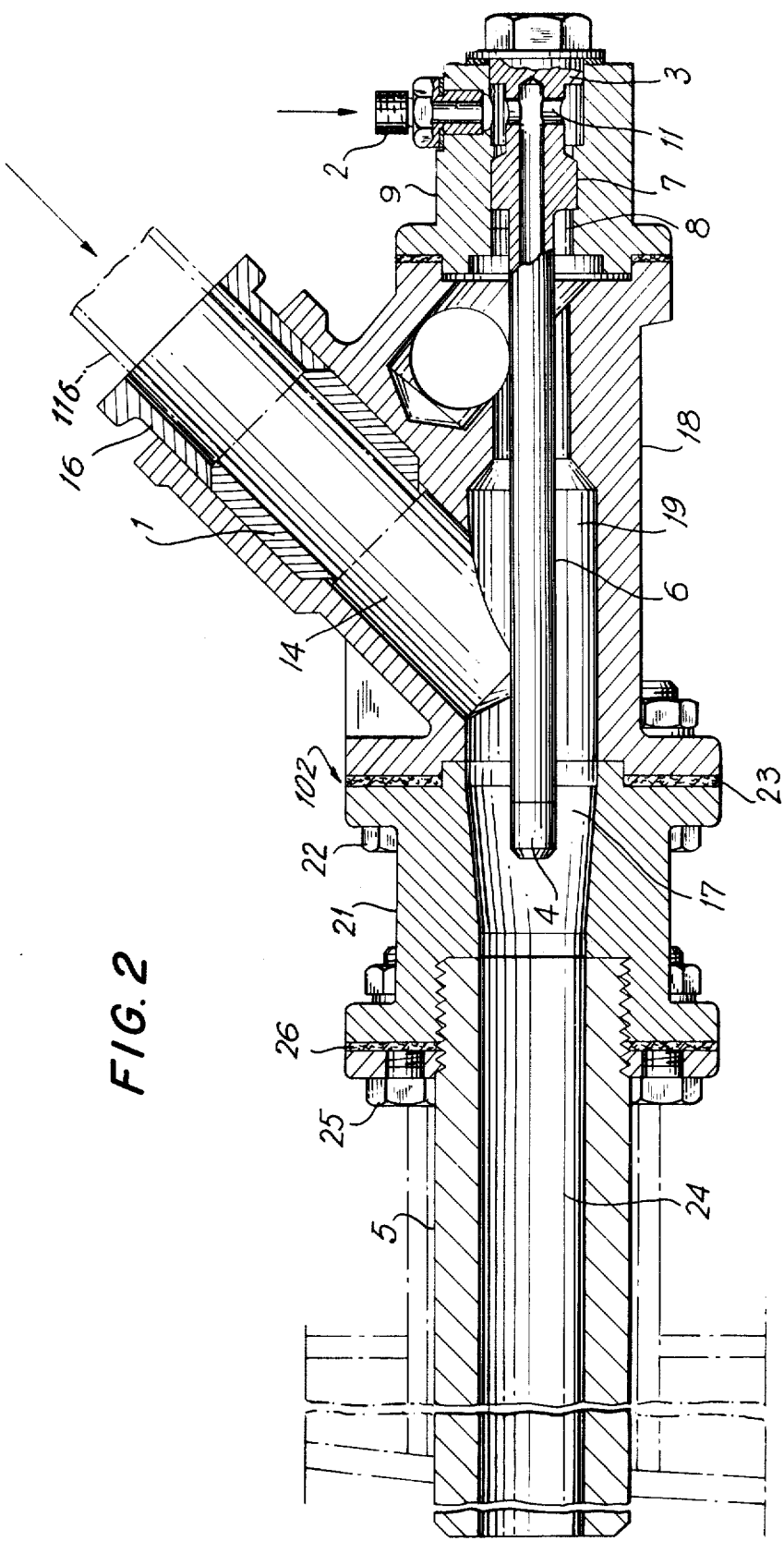
FIG. 2 shows in longitudinal section and on enlarged scale a tuyere for the utilization of liquid fuel for heating and reduction during the process of the present invention.

Referring to FIG. 1, therein is seen a fuming furnace 101 containing tuyeres 102 provided with nozzles (not shown). The tuyeres 102 communicate with blast pipes 116 forming part of a conduit means which includes a circular conduit 108 from which air heated to about 250°C is delivered at a pressure of about 1.2 atmospheres. The pipes 116 are connected to the tuyeres so as to be disposed at an angle of 45° with respect to the horizontal axis of the tuyeres as seen in FIG. 2. The tuyeres and blast pipes are distributed about the furnace.

Fuel oil is introduced into the tuyeres under pressure by means of a suitable pump 106. As shown schematically in FIG. 1, the fuel oil (under a pressure in the range between 12 to 40 atmospheres) is forced by the pump 106 through a fuel supply conduit means 103 into a circular header 109 connected to the tuyeres 102. The individual flows of fuel oil to the respective tuyeres are controlled by valves 113 operatively connected with the supply pipes downstream of the header 109. An individual fuel oil pipe 104 communicates with the header 109 and constitutes a means whereby the fuel oil can, if desired, be returned to the fuel storage tank 105. At the outlet of the fuel oil pipe 104 there is located a valve 112 for controlling the return flow from the header 109 to the storage tank. This return line from the header 109 to the supply tank is used only during starting operations to circulate the fuel until the required atomizing conditions are reached prior to starting injection. Located in the tank 105 is a heater 110 for heating the fuel oil to a temperature of approximately 70°-80°C. In addition a bypass line provided with a shut off valve 107 is located between the fuel oil pump 106 and the tank 105 so that the oil pump can draw heated oil from the storage tank.

Referring now in greater detail to FIG. 2 the fuel oil supply system is connected to a pipe union 2 of the tuyere. At pipe union 2 the fuel arrives at a pressure between 12 to 40 atmospheres and through stem 3 it enters nozzle 4 where it is atomized. The blast conduit 116 from which air heated to about 250°C is delivered at sufficiently high pressure to overcome the hydrostatic pressure of the molten slag, e.g. at a pressure of about 1.2 atmospheres, the conduit 116 being connected to the tuyere through the intermediary of coupling mechanism 16 and stuffing box 1. The nozzle 4 is formed on a stem 6 having an enlarged part 7 accommodated in a bore 8 in the part 9 to which pipe union 2 is connected. The stem 6 is thus supported cantilever fashion in main body 18 without external support. An annular passage 17 is confined between main body 18 and the nozzle 4. The air is supplied to the annular passage 17 upstream of the nozzle 4 and in immediate proximity therewith via channel 14.

An extension 21 is mounted on the main body 18 by bolts 22 and via packing 23 in such a manner that the annular passage 17 tapers in the extension 21. A pipe 5 is connected to extension 21 and has a bore 24 in extension of said annular chamber 17, there being provided a locking mechanism 25 and a packing 26 between pipe 5 and extension 21. The preferred location of the nozzle 4 in the annular passage 17 ensures proper combustion conditions pertinent to the fuel used, the furnace conditions and other operating conditions and circumstances. The maintainance of a high pressure in the range between 12 and 40 atmospheres in stem 3 will, in addition to effecting atomization of the liquid fuel, also provide for the uniform dispersion of the fuel oil in the air stream flowing through the annular passage 17 into the tuyere.

In a specific example of the invention, a molten slag was treated in fuming furnace 101 having a rectangular cross-section of 5.9 m$^2$. A slag 111 was used which resulted from the smelting of agglomerates of lead concentrates and its original analysis was: ZnO - 18%, FeO - 28%, SiO$_2$ - 22%, CaO - 14%, and Pb - 1.5%. The temperature of the slag entering the furnace via a charging port 114 situated 500 mm above the non-agitated surface of the slag 111 in the fuming furnace was 1350°C. During an initial charging period, the slag fell in cascade fashion into the furnace through the charging port 114, and a slag discharge port 115 situated at the level of the non-agitated surface of the slag in the fuming furnace was closed. A mixture of air and masout was injected continuously into the furnace through the tuyeres 102. The air supplied to the tuyeres was at a pressure of 1.2 atmospheres and a temperature of 250°C. The masout was uniformly dispersed in the air stream with the aid of the pump 106 which developed an oil pressure of at least 20 atmospheres. The masout was preheated to a temperature of 80°C. During this period the flow rate of the heated air was 10000 cubic meters per hour and for the masout was 1300 kilograms per hour.

After filling the furnace up to the level of the discharge port 115, the flow of slag through the charging port 114 was stopped, the flow rate of the heated air under pressure was increased to 15,500 cubic meters per hour, the flow rate of masout was increased to 2100 kilograms per hour, and after 100 minutes of treatment, the slag discharge port 115 was opened. The supply of fresh slag through the charging port 114 was resumed and the slag again fell in cascade fashion into the furnace so that a continuous flow of slag through the interior of the furnace was established. Under both flow rate conditions, the air and atomized masout mixture was blown continuously at 1.2 atmospheres into the slag at the bottom of the fuming furnace by means of the tuyeres 102, so that the slag was vigorously agitated. In such a manner the interior of the furnace was heated to a temperature of 1350°C. Additional or secondary air was admitted to the furnace at a level above the charging port 114. The secondary air was supplied in sufficient excess to convert the lead and zinc vapors rising from the molten slag to their corresponding oxide fumes. After treatment in the fuming furnace, the final content of free metals in the treated slag was: Zn 1.8% and Pb 0.1%.

Thus, it will be apparent that the present invention provides a method for treating non-ferrous slags with fuel and air via an appropriate tuyere for the efficient recovery of valuable metals from these slags. The method is applicable to a wide diversity of slags containing a diversity of metals. It is rapid and efficient. The use of a liquid fuel in accordance with the method for developing heat and for reduction has the following advantages over the methods of the prior art:

a. precise determination and maintenance of the feed or supply necessary is possible;
b. automatic maintenance of the fuel-air ratio is possible;
c. there is a low expenditure of fuel in relation to the slag i.e. about 16%;
d. a simplified fuming plant leading to an increase in the efficiency of the process; and
e. fewer stoppages are needed for repairs and overhaul of the fuming plant.

The invention may be readily incorporated into a conventional smelting procedure and plant, without extensive modification of either.

What is claimed is:

1. A method of treating non-ferrous slag in a furnace, said method comprising heating and reducing molten slag by injecting liquid fuel and air into the slag, said injecting of liquid fuel and air including the steps of discharging a liquid fuel reduction agent under a pressure of at least 12 atmospheres through a nozzle to produce an atomized stream of the fuel forming a narrowing annular passageway coaxially around the outlet of said nozzle, introducing the thus atomized stream of fuel into a stream of air in said passageway for mixing the stream of air and the atomized stream of fuel and carrying the mixed streams of air and fuel into the slag as a reducing agent.

2. A method as claimed in claim 1 wherein the stream of air is delivered at a pressure greater than atmospheric in immediate proximity to the outlet of the nozzle.

3. A method as claimed in claim 2 comprising feeding the mixed streams of atomized fuel and air into an extension passage coaxial with said nozzle, said extension passage opening into the furnace at a level below the surface of the slag.

4. A method as claimed in claim 3 comprising heating the stream of air to a temperature of about 250°C before delivery to said nozzle.

5. A method as claimed in claim 4 comprising heating the liquid fuel to a temperature between 70° and 80° C before delivery to said nozzle.

6. A method as claimed in claim 5 wherein the pressure of the liquid fuel is between 12 and 40 atmospheres.

7. A method as claimed in claim 3 comprising introducing the air into said annular passageway at an angle of 45° relative to the axis of the nozzle.

8. A method as claimed in claim 1 comprising supplying secondary air into the furnace above the level of the slag in sufficient excess to convert rising metal vapors to corresponding oxides.

* * * * *

UNITED STATES PATENT OFFICE
CERTIFICATE OF CORRECTION

Patent No. 3,891,428 Dated June 24, 1975

Inventor(s) Yordan Todorov Yordanov et al.

It is certified that error appears in the above-identified patent and that said Letters Patent are hereby corrected as shown below:

On the cover sheet insert:

[30] Foreign Application Priority Data

Bulgaria 6209 March 24, 1966

Signed and Sealed this eleventh Day of November 1975

[SEAL]

Attest

RUTH C. MASON
Attesting Officer

C. MARSHALL DANN
Commissioner of Patents and Trademarks